(12) United States Patent
Hori et al.

(10) Patent No.: US 6,357,545 B1
(45) Date of Patent: Mar. 19, 2002

(54) POWER UNIT FOR VEHICLE

(75) Inventors: Yoshiaki Hori; Tohru Nishi; Yoshihisa Kanno, all of Wako (JP)

(73) Assignee: Honda Giken Kabushiki Kaisha, Tokyo (JP)

(*) Notice: Subject to any disclaimer, the term of this patent is extended or adjusted under 35 U.S.C. 154(b) by 0 days.

(21) Appl. No.: 09/174,418

(22) Filed: Oct. 19, 1998

(30) Foreign Application Priority Data

Oct. 21, 1997 (JP) .............................................. 9-288964

(51) Int. Cl.⁷ .............................................. B62M 29/00
(52) U.S. Cl. ...................................... 180/219; 180/230
(58) Field of Search .............................. 180/219, 226, 180/230, 65.1, 65.2, 220; 74/473.12, 606 R, 335; 192/84.6

(56) References Cited

U.S. PATENT DOCUMENTS

| | | | |
|---|---|---|---|
| 3,894,442 A | * 7/1975 | Hembree | 74/335 |
| 4,373,601 A | * 2/1983 | Onda et al. | 180/226 |
| 4,388,979 A | * 6/1983 | Fritzenwenger | 180/226 |
| 4,463,823 A | * 8/1984 | Tsuboi | 180/226 |
| 4,607,718 A | * 8/1986 | Nagataki et al. | 180/226 |
| 4,621,680 A | * 11/1986 | Funabashi | 165/44 |
| 4,671,375 A | * 6/1987 | Oike et al. | 180/227 |
| 4,790,204 A | * 12/1988 | Tury et al. | 74/483 PB |
| 4,828,069 A | * 5/1989 | Hatsuyama | 180/219 |
| 4,920,825 A | * 5/1990 | Okazaki et al. | 74/606 R |
| 5,515,940 A | 5/1996 | Shichinohe et al. | 180/376 |
| 5,542,309 A | 8/1996 | Wenger et al. | 74/337.5 |
| 5,584,214 A | * 12/1996 | Hayashi et al. | 74/732.1 |
| 5,954,178 A | * 9/1999 | Fischer et al. | 192/90 |
| 5,984,068 A | * 11/1999 | Reed, Jr. | 192/84.6 |
| 6,032,776 A | * 3/2000 | Imao | 192/84.6 |
| 6,109,383 A | * 8/2000 | Matsuto et al. | 180/220 |
| 6,189,637 B1 | * 2/2001 | Tosaka et al. | 180/219 |

FOREIGN PATENT DOCUMENTS

JP 37-16106 11/1935

* cited by examiner

Primary Examiner—J. J. Swann
Assistant Examiner—L. Lum
(74) Attorney, Agent, or Firm—Birch, Stewart, Kolasch & Birch, LLP

(57) ABSTRACT

To provide a power unit mounted for a vehicle, such as a motorcycle, wherein the power unit is attached to a transmission actuating device or attached to a clutch actuating device, or attached to both actuating units. A power unit for a vehicle having an internal combustion engine mounted in a condition where a crank shaft is oriented in the longitudinal direction of the vehicle body, and having a transmission arranged behind the internal combustion engine, wherein one or both of a transmission actuating electric motor for driving an transmission actuating device of the transmission and a clutch actuating electric motor for driving a clutch actuating device of a clutch are arranged in a rear section of said power unit.

15 Claims, 18 Drawing Sheets

POWER UNIT FOR VEHICLE

BACKGROUND OF THE INVENTION

1. Field of the Invention

The present invention relates to a power unit attached to a transmission actuating device, a power unit attached to a clutch actuating device, or a power unit attached to both a transmission actuating device and a clutch actuating device, mounted on a vehicle such as a motorcycle.

2. Description of Related Art

A power unit for a vehicle having a crankshaft oriented in the longitudinal direction of the vehicle and having an internal combustion engine is disclosed in Japanese Patent Publication Laid-open No. Sho. 37-16106.

With such a vehicle power unit, a drive motor section for performing transmission actuation is provided inside the power unit, which means that it is difficult to carry out maintenance and it is difficult to adjust the drive motor section.

Also, since the drive motor section is provided linked to the transmission, a casing housing the drive motor section and the transmission is enlarged, and it is difficult to increase the space for an operator's legs.

SUMMARY AND OBJECTS OF THE INVENTION

The present invention relates to improvements to a power unit for a vehicle that solves these type of problems, and provides a power unit for a vehicle having an internal combustion engine mounted so that a crank shaft is oriented in the longitudinal direction of the vehicle body, and having a transmission arranged behind the internal combustion engine, wherein one or both of a transmission actuating electric motor for driving a transmission actuating device of the transmission and a clutch actuating electric motor for driving a clutch actuating device of a clutch are arranged in a rear section of the power unit.

In the present invention, since the electric motors are arranged in a rear portion of the power unit, maintenance and adjustment of the electric motors can be simply and easily carried out even in a case where the power unit is not disassembled. Also, operators comfort when riding can be improved by widening a space for an operator's legs.

Further, with the structure of the present invention, it is possible to effectively utilize a space between pivot portions of a pair of left and right rear forks, and it is possible to reliably protect the electric motors by means of the pivot portions of the rear forks.

Still further, with the structure of the present invention, the manufacture of rotary shafts of the electric motors and shafts coupled to these rotary shafts is carried out at the same time as the manufacture of rotary shafts of the transmission and clutch, and it is possible to improve productivity.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
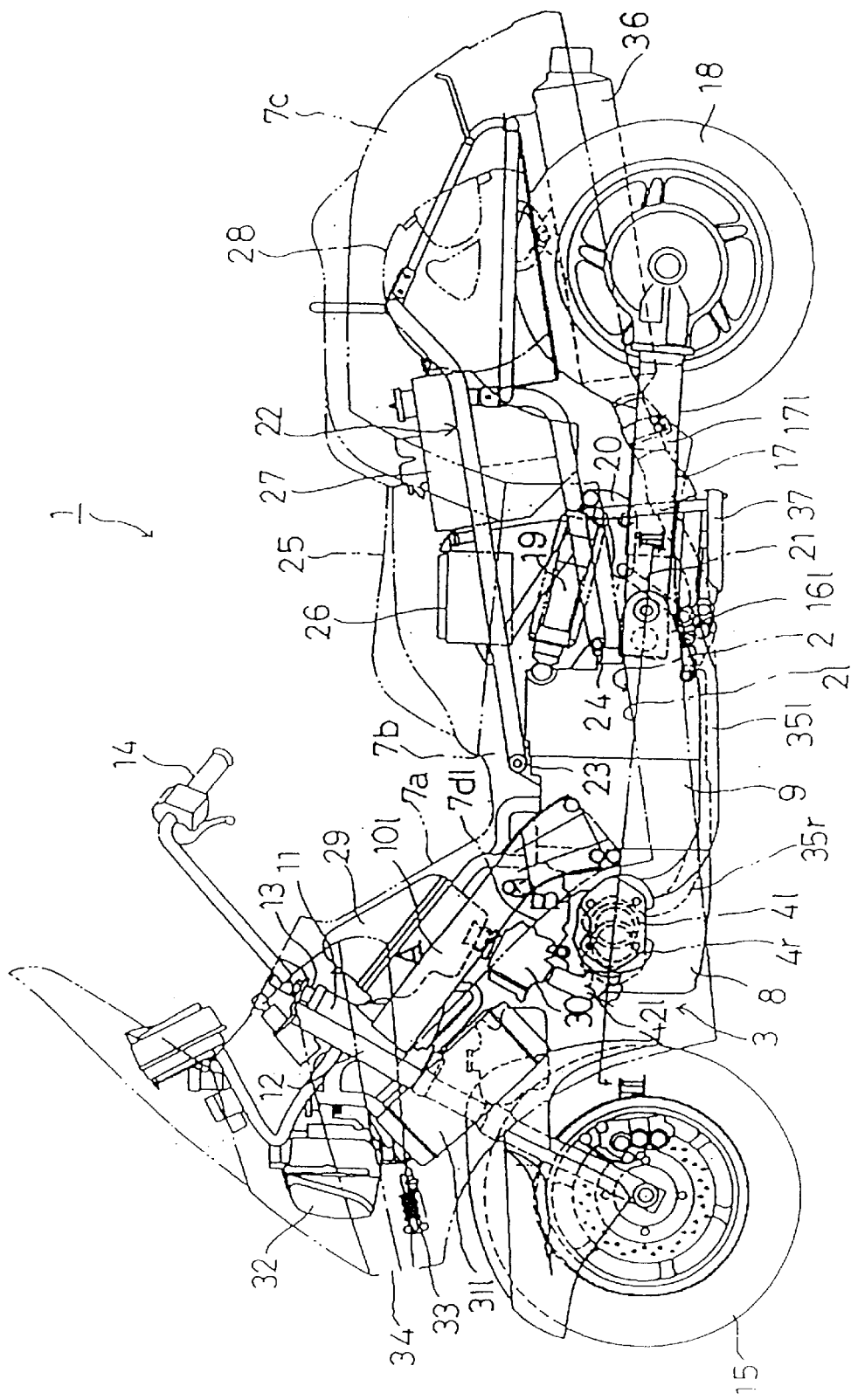
FIG. 1 is a left side elevation of a motorcycle, having a low slung floor of one embodiment of the present invention.
Figure 2:
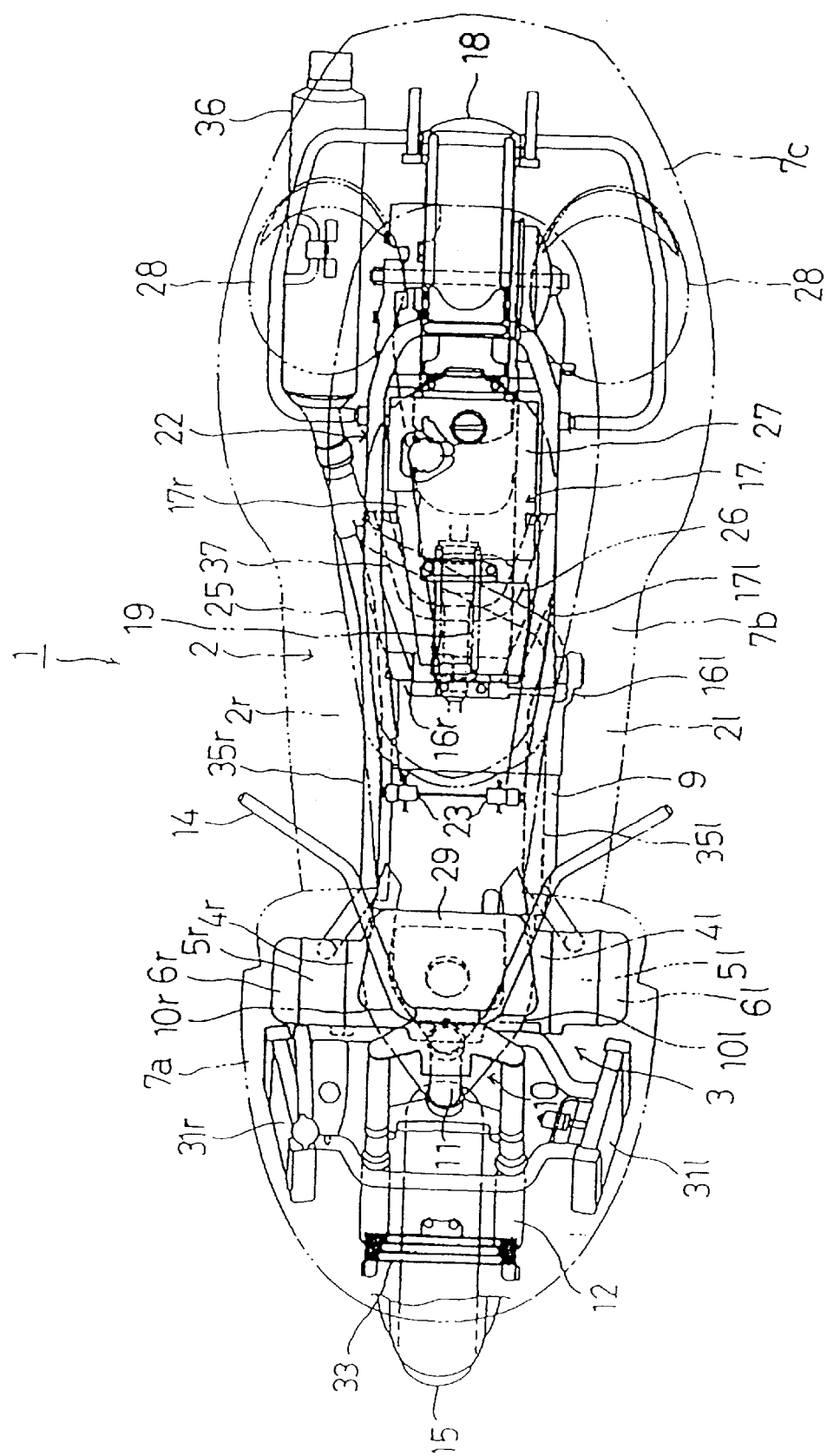
FIG. 2 is a plan view of the motorcycle, having a low slung floor, of one embodiment of the present invention.

In FIG. 1 and FIG. 2, a motorcycle 1 having a low slung floor 2 is provided with a horizontal opposed 2-cylinder internal combustion engine 3 positioned further towards the front of the vehicle than the low slung floor 2. Each of left and right (upper and lower FIG. 2) cylinder heads 5*l*, 5*r* of the horizontal opposed 2-cylinder internal combustion engine 3, looking in the travelling direction of the vehicle, are arranged in front of left and right step floors 2*l*, 2*r*, and are covered by left and right cylinders ports 4*l*, 4*r*, left and right cylinder head covers 6*l*, 6*r*, and a front vehicle body cover 7*a* constituting a front section of a vehicle body cover 7.

The left and right step floors 2*l*, 2*r* are respectively formed as plates extending in a longitudinal direction of the vehicle, with the widths becoming wider from the front of the vehicle to the rear. Portions in front of the left and right step floors 2*l*, 2*r* constitute left and right front inclined portions 7*dl*, 7*dr* (7*dr* is not shown in the drawing) formed in the front vehicle body cover 7*a*, with these left and right front inclined portions 7*dl*, 7*dr* and in the left and right step floors 2*l*, 2*r* together forming the low slung floor 2. The left and right cylinder heads 5*l*, 5*r*, as has been described above, are covered by the front vehicle body cover 7*a* and are arranged so as to face the left and right front inclined portions 7*dl*, 7*dr*.

A crankcase 8 of the horizontal opposed 2-cylinder internal combustion engine 3 is sandwiched between the left and right cylinders 4l, 4r and arranged in the center, widthwise, of the vehicle, while a transmission case 9 adjacent to the crankcase 8 is arranged inside a saddle shaped floor tunnel formed by the floor vehicle body cover 7b constituting the floor section of the vehicle body cover 7, and these two cases are united by being connected together.

The crankcase 8 and transmission case 9 that have been united by connecting together as described above constitute part of the frame of the motorcycle 1 (a central part), and they are respectively connected, at upper left and right side wall portions in the vicinity of connecting portions of the cases, to lower end portions of a main frame 10 that runs diagonally downwardly from the upper front of the vehicle, and are fixed by bolts. This position is a position in front of the left and right step floors 2l, 2r. The main frame 10 does not extend as far as a rear fork 17, which will be described later, which means that spaces of the left and right step floors 2l, 2r can be made wider.

The main frame 10 branches to the left and to the right from a head pipe 11 to form left and right main frame sections 10l, 10r, and these left and right main frame sections 10l, 10r respectively extend diagonally downwardly to upper left and right side wall portions in the vicinity of connecting portions of the crankcase 8 and the transmission case 9, and are connected and fixed there as described above.

A steering stem 13 which is integral with a front fork 12 is inserted into the head pipe 11, as is well known, and the steering direction of a front wheel 15 is changed by a handlebar 14 that turns integrally with the steering stem 13.

At rear end parts of the transmission case 9, on left and right sides, left and right support arms 16r, 16l are provided so as to extend towards the rear, and front ends of left and right arm portions 17r, 17l of a rear fork 17 are respectively rotatably connected to left and right sides of the left and right support arms 16r, 16l.

A left side arm portion 17l of the rear fork 17 is formed as a comparatively large size cylinder. An output shaft 54 (refer to FIG. 3) of the transmission protruding from the transmission case 9 and a shaft connected via a universal joint pass through the cylinder (i.e. the rear fork 17). A bevel gear is integrally attached to an end of this shaft, and meshes with a bevel gear attached to a rotation shaft side of the rear wheel 18. As a result, power generated by the horizontal opposed 2-cylinder internal combustion engine 3 is transferred to the rear wheel 18 (this is not shown in the drawing). The rear end of the right side arm portion 17r of the rear fork 17 supports a support axis of the rear wheel 18.

The front end of the rear fork 17 is caught between left and right step floors 2l, 2r and is positioned at an inner side of these step floors, which means that the front end of the rear folk 17 does not interfere with the left side step floor 2l. Particularly, the universal joint does not interfere with the left step floor 2l. It is therefore possible to widen spaces of the left and right step floors 2l, 2r.

Upward and downward rocking of the transmission case 9 with respect to the rear fork 17 is absorbed by a shock absorber 19 suspended between the rear fork 17 and the transmission case 9 in a central portion in a widthwise direction of the vehicle. The front end of the shock absorber 19 is pivoted at a corner above the rear end of the transmission case 9. A rear end of the shock absorber 19 is rotatably connected by a pin at one end of an L-shaped link 20. The L-shaped link 20 having a central portion supported at a point slightly closer to a front end than a central portion, in a longitudinal direction, of the rear fork 17, and the other end of the L-shaped link 20 is rotatably connected by a pin to the other end of a link 21 having one end pivoted below the rear end of the transmission case 9.

At a rear part of the transmission case 9 being higher than the rear fork 17, rear frame pipe assembly 22 includes a plurality of bent pipes and straight pipes attached in an unswingable manner to the transmission case 9 at upper surface connection points 23 (2 positions, one left and one right) of the transmission case 9 and lower connections points 24 (2 positions, one left and one right) further back than the connection points 23.

A battery 26 and a fuel tank 27 are provided one behind the other in the longitudinal direction at a lower part of a double seat 25 supported at the rear frame pipe assembly 22, and storage shelves for a helmet 28 are provided on both left and right sides of the rear wheel 18. The double seat 25 is also supported by the rear frame pipe assembly 22.

A rear half section of the rear frame pipe assembly 22 is covered by a rear vehicle body cover 7c continuing from the floor vehicle body cover 7b. The rear vehicle body cover 7c can be opened and closed by pivoting around a pivot portion, not shown in the drawings, and the helmet 28 can be taken out or stowed by holding the upper part of the rear vehicle body cover 7c and opening it outwards.

The intake system of the horizontal opposed 2-cylinder internal combustion engine 3 has an air cleaner case 29 and a carburetor 30, and these are arranged inside a front vehicle body cover 7a above the horizontal opposed 2-cylinder internal combustion engine 3.

The air cleaner case 29 is arranged inside the front vehicle body cover 7a above the horizontal opposed 2-cylinder internal combustion engine 3, inside a space A enclosed by left and right main frame sections 10l, 10r of the main frame 10 and the front vehicle body cover 7a, and forming a triangular shape widening towards the front and sloping downwardly towards the rear when viewed from the side.

The front part of the space A is a comparatively wide space leading to a head pipe 11 which is inclined from the side, and the air cleaner case 29 arranged inside the space A can be made as large as the volume of the space A.

Inside the front vehicle body cover 7a, at an upper part of the front wheel 15, radiators 31l, 31r. are provided on both the left and right sides of the front fork 12, and an oil cooler 33 is provided forward of the radiators at a central portion, in a widthwise direction of the vehicle, in a space between a fender of the front wheel 15 and a headlight 32. The radiators 31l, 31r and the oil cooler 33 are respectively connected to the left and right cylinders 4l, 4r of the horizontal opposed 2-cylinder internal combustion engine 3 and the crankcase 8 by pipelines not shown in detail in the drawings.

Core portions of the pair of radiators 31l, 31r are arranged in a sloping fashion such that they slope downwardly and outwardly from the front to the rear of the vehicle, and a core portion of the oil cooler 33 is arranged along the width direction of the vehicle, sloping slightly upwardly from the front to the rear of the vehicle. Both the radiators 31l, 31r and the oil cooler 33 are effectively cooled by air that flows in during travel from an air intake port 34 formed in a front end of the front vehicle body cover 7a and a central opening running forwardly and downwardly from the front vehicle body cover 7a (a portion partially housing the front wheel 15).

One end of each of a pair of exhaust pipes 35l, 35r, that will be described later, is connected to rear parts of the left and right cylinder heads 5*l*, 5*r* of the horizontal opposed 2-cylinder internal combustion engine 3, and the other ends of the exhaust pipes 35*l*, 35*r* are merged together and connected to a muffler 36. A stand 37 is provided for supporting the motorcycle.

In this embodiment, of the left and right cylinder heads, the right cylinder head 5*r* is arranged further forward than the left cylinder head 5*l*, and this makes it easier to make the lengths of the exhaust pipes 35R and 35L that meet at the right side of the vehicle coincide. Also, a crossing part of the left exhaust pipe to the right side of the vehicle contributes to reducing the protrusion of the exhaust pipe by passing downwardly through a casing housing the transmission and maintaining minimum ground clearance.

The arrangement and structure of the horizontal opposed 2-cylinder internal combustion engine 3 will be further described.

Figure 7:
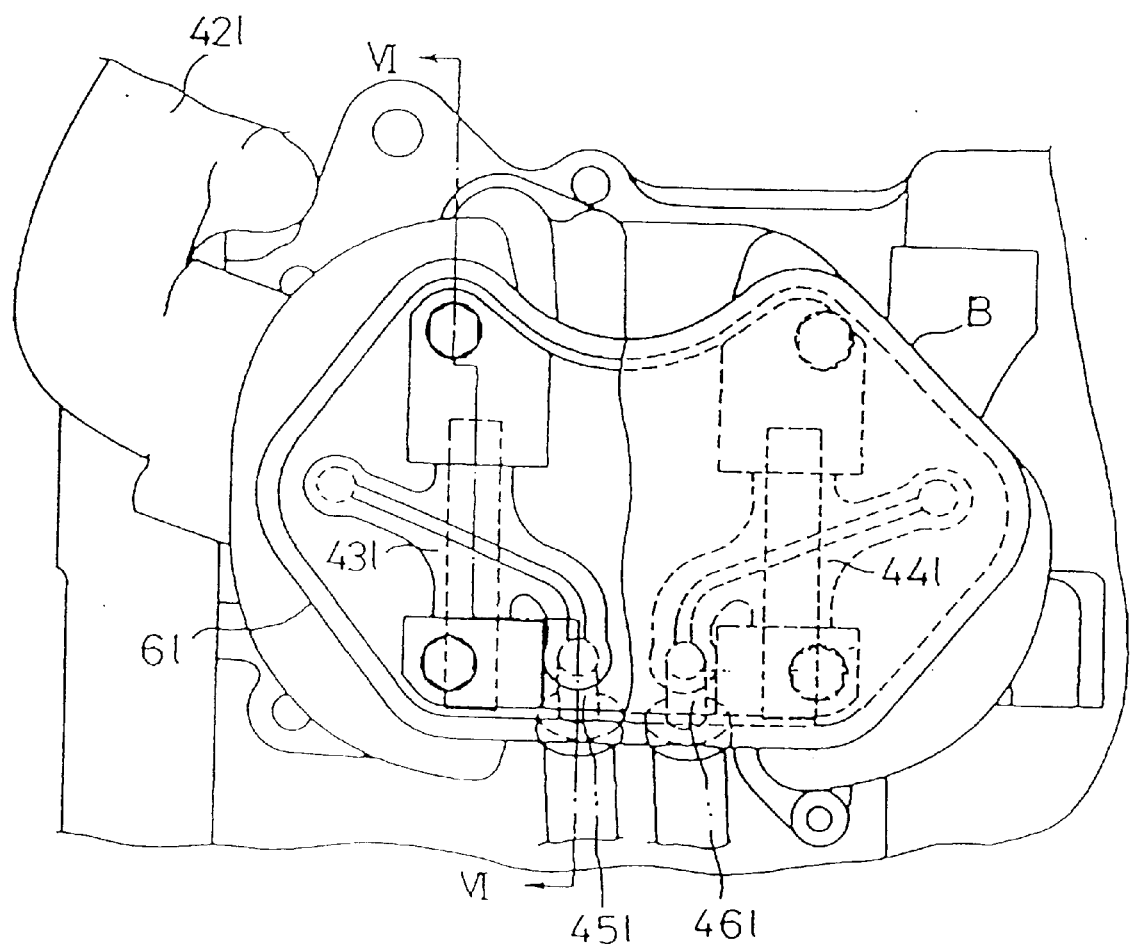
FIG. 7 is an enlarged left side view of the left side cylinder head cover of FIG. 5, showing a partial cutaway.
Figure 8:
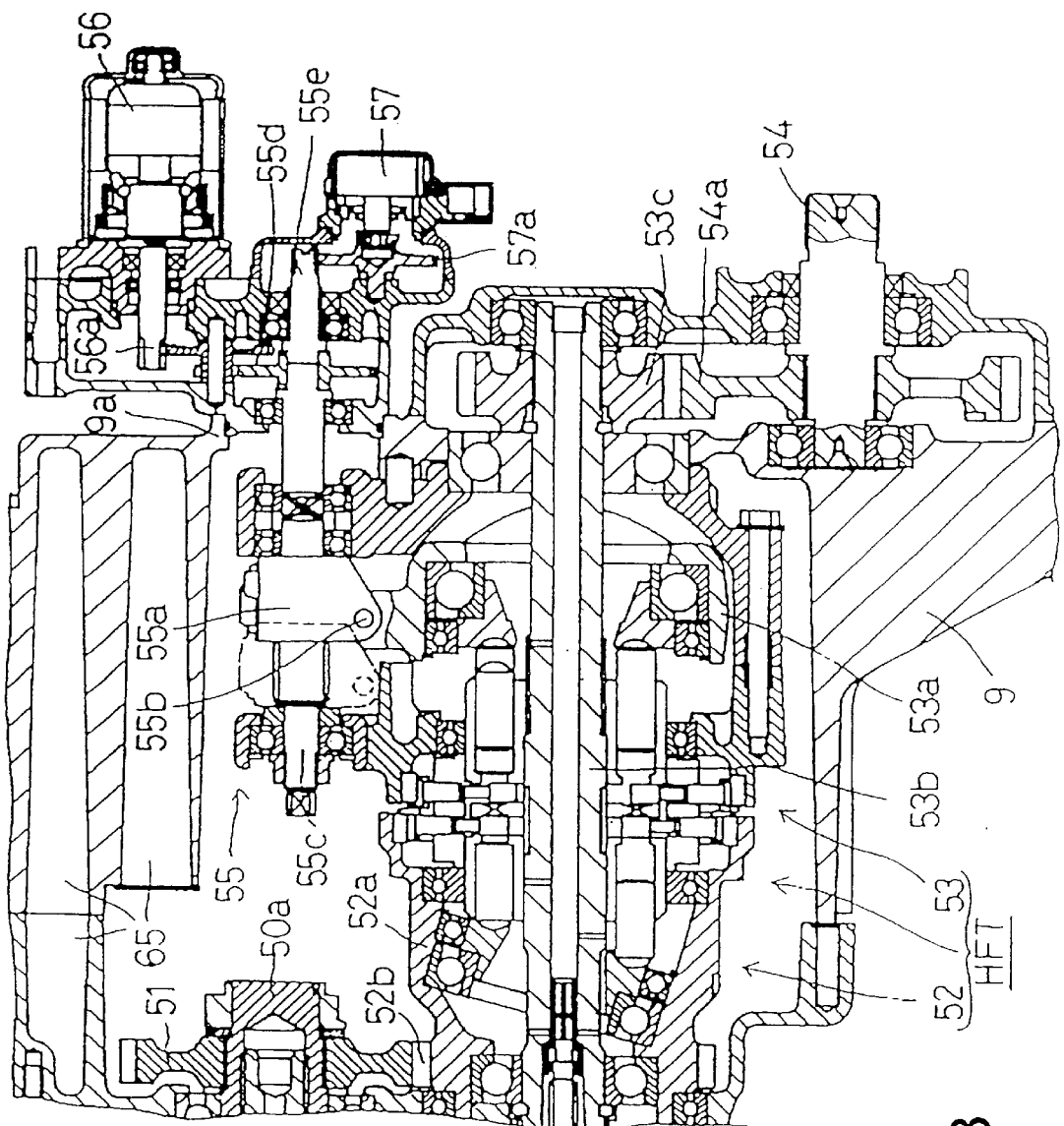
FIG. 8 is an enlarged cross-sectional plan view of essential parts of FIG. 3.

Upper rear wall surfaces (upper halves) of the cylinder heads 5*l*, 5*r* and the left and right cylinder head covers 6*l*, 6*r*, respectively form downward inclines B that are high at the front and low at the rear, as shown in FIG. 1 and FIG. 7. Lower rear wall surfaces (lower halves), upper front wall surfaces and lower front wall surfaces of the left and right cylinder heads 5*l*, 5*r* and left and right cylinder head covers 6*l*, 6*r* respectively form upward or downward slopes orthogonal to the respective directions.

These left and right cylinder heads 5*l*, 5*r*, as has already been described, are arranged in front of the left and right step floors 2*l*, 2*r* so as to face left and right front inclined portions 7*dl*, 7*dr* of the front vehicle body cover 7*a* continuous with the left and right step floors 2*l*, 2*r*. This means that these left and right front inclined portions 7*dl*, 7*dr* run along the above described inclines B formed at the rear upper wall portions of the left and right cylinder heads 5*l*, 5*r*, and can be made to slope greatly towards the front. In this way, spaces in front of the left and right step floors 2*l*, 2*r* can be enlarged, legroom on the floor portions can be increased and riding feel can be improved.

Figure 3:
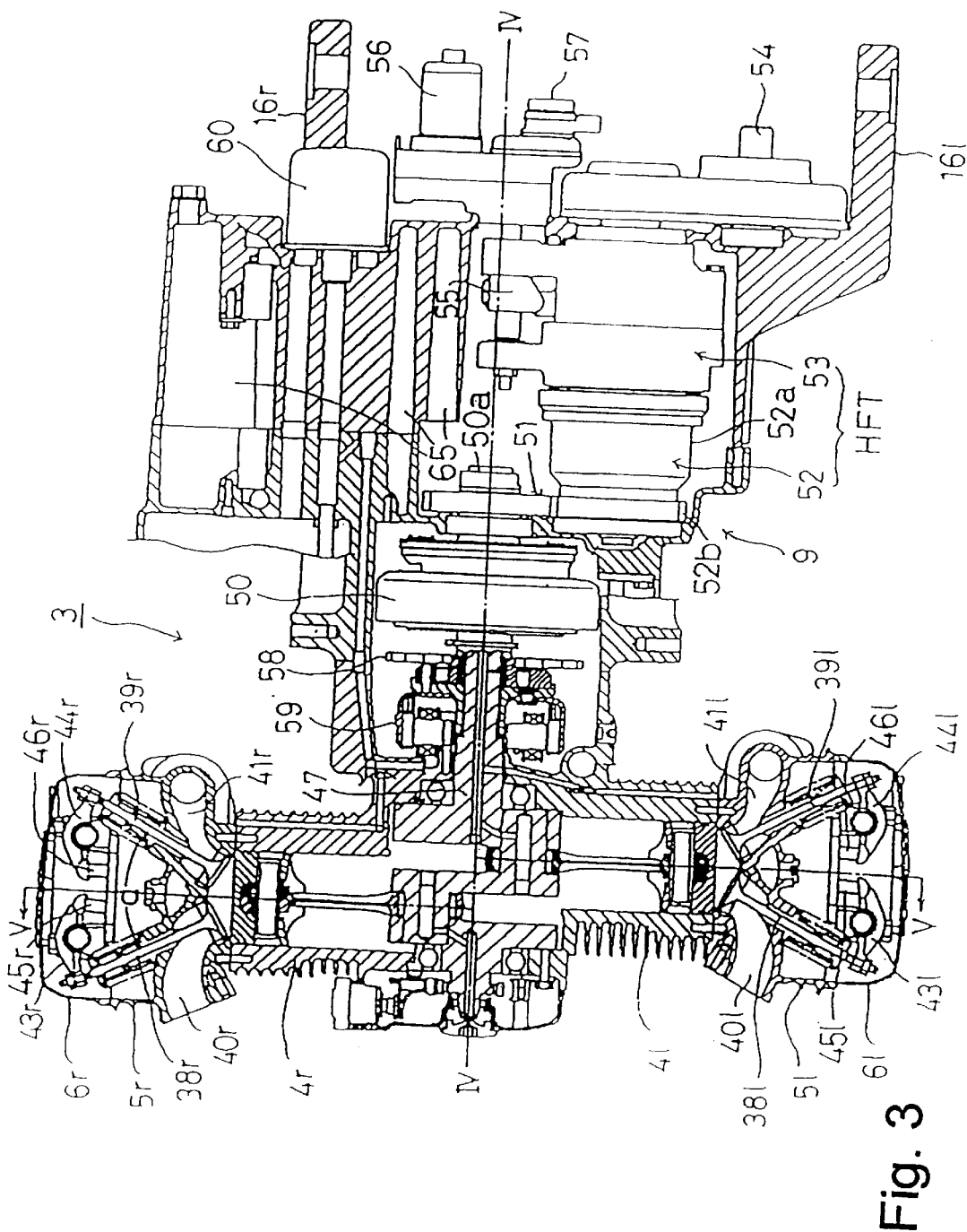
FIG. 3 is a longitudinal section, taken along line III—III in FIG. 1, with a push rod omitted from the drawing.

As shown in FIG. 3, left and right valve systems are housed in the left and right cylinder heads 5*l*, 5*r*, and left and right intake and exhaust valve systems 38*l*, 38*r*, 39*l*, 39*r* of the left and right valve systems are arranged in the directions of the intake and exhaust systems (direction of the intake valve system 38*l* with respect to the exhaust system 39*l*, and the direction of the intake valve system 38*r* with respect to the exhaust valve system 39*r*) have a horizontal included angle α. Rear walls of the sections housing the left and right valve systems, namely the rear walls of the left and right cylinder heads 5*l*, 5*r*, are respectively formed sloping downwards so that they are high at the front and low at the rear.

Because of the above described arrangement of the left and right intake and exhaust systems 38*l*, 38*r*, 39*l*, 39*r*, the left and right exhaust and intake ports 41*l*, 41*r* are formed in the left and right cylinder heads 5*l*, 5*r* and respectively run downwardly from the left and right cylinder heads 5*l*, 5*r*, and end parts of the left and right exhaust and intake ports 41*l*, 41*r* are connected to one end of the exhaust pipes 35*l*, 35*r*.

The exhaust pipes 35*l*, 35*r* also go further downwardly from that point, and after that are fed orthogonal to the vehicle body, as described above.

Figure 5:
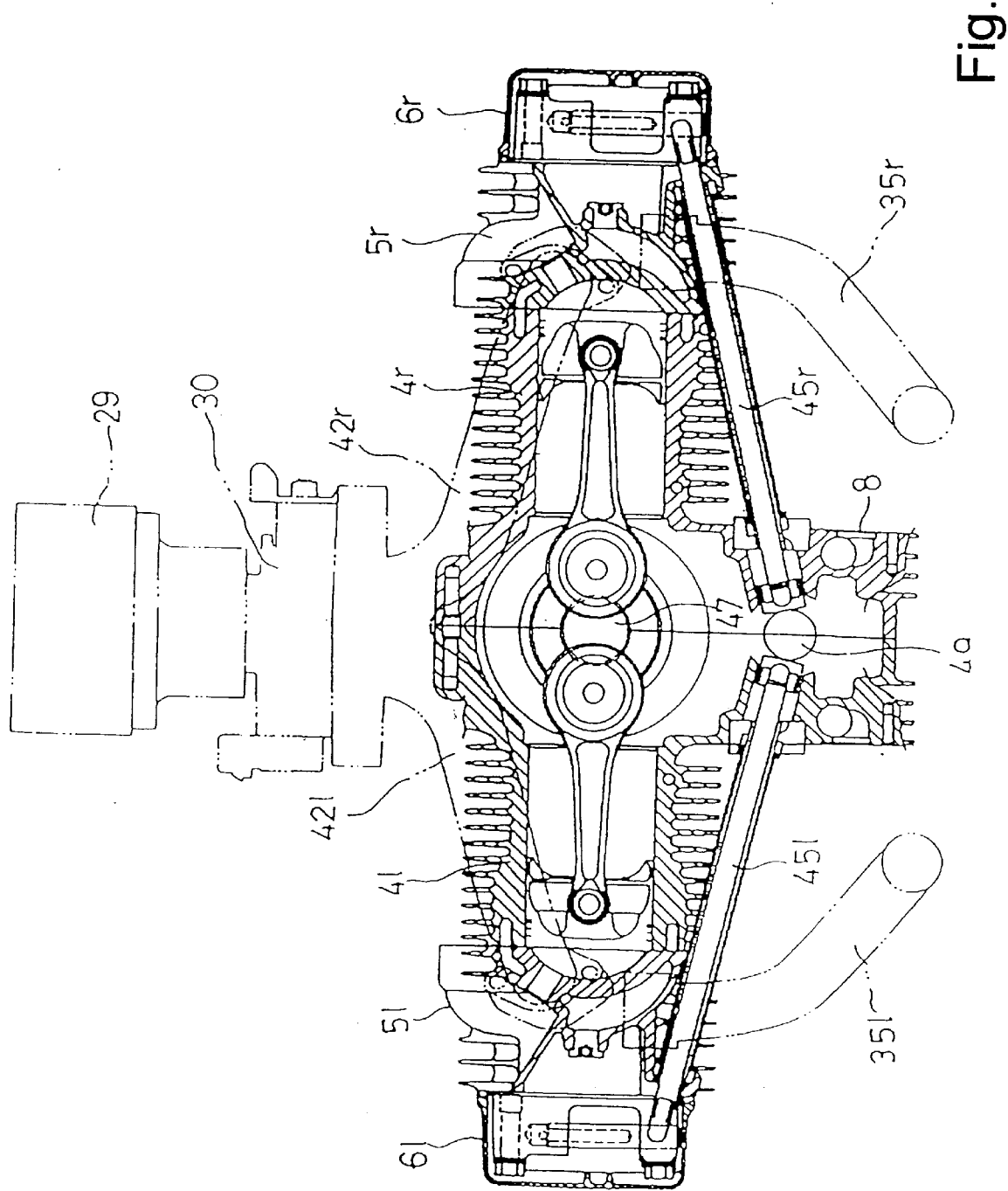
FIG. 5 is a cross section, taken along line V—V in FIG. 4, with a rocker arm omitted from the drawing.
Figure 6:
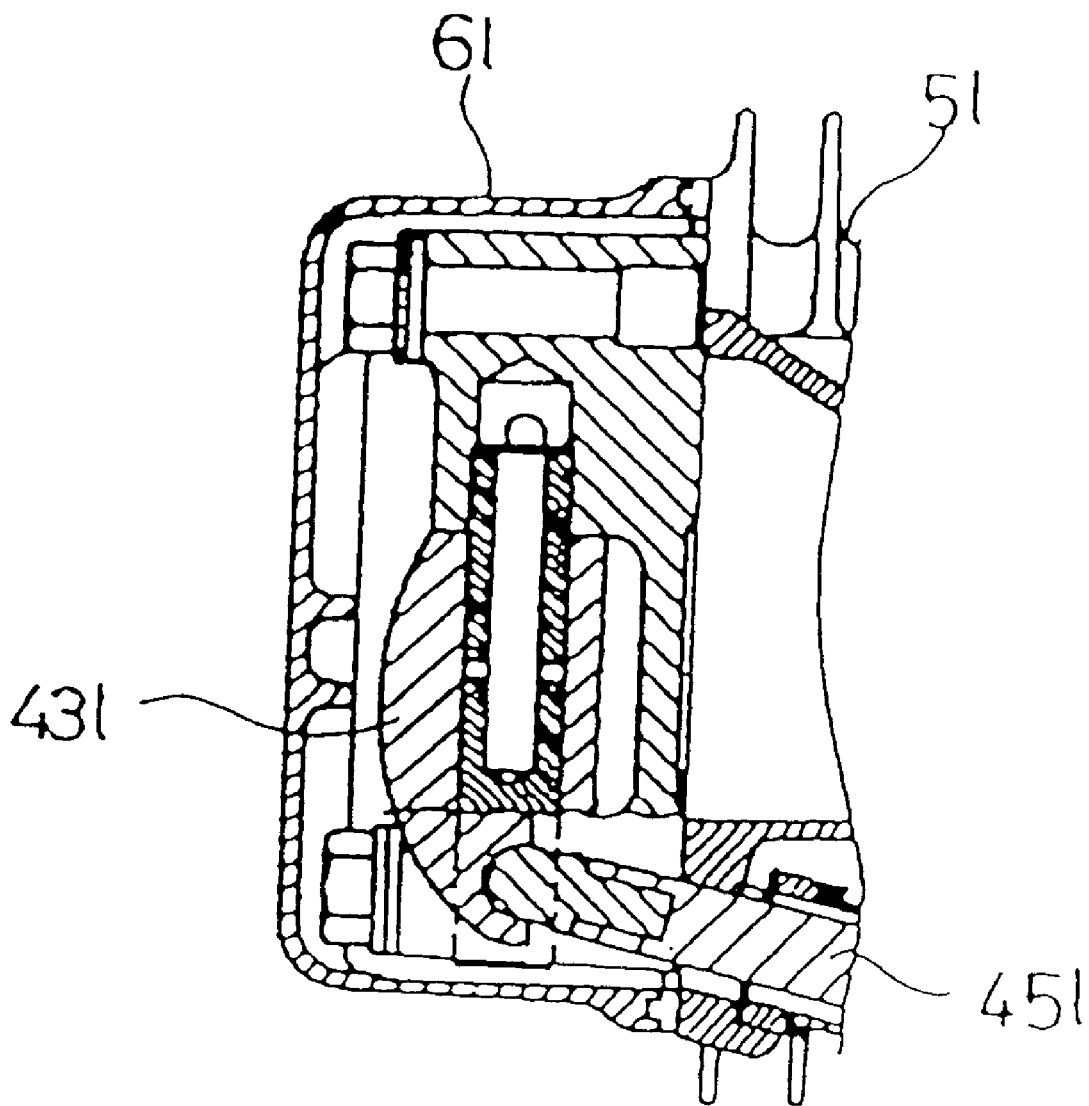
FIG. 6 is a cross section taken along line VI—VI in FIG. 7, showing part of a left side cylinder head cover of FIG. 5.

The left and right intake ports 40*l*, 40*r* formed in the left and right cylinder heads 5*l*, 5*r* extend upwardly from the front of respective left and right cylinder heads 5*l*, 5*r*, and one end of the left and right intake manifolds 42*l*, 42*r* projecting from the carburetor 30 are connected to ends of the respective left and right intake ports 40*l*, 40*r* (refer to FIG. 1, FIG. 3 and FIG. 5).

Because of the above arrangement of the left and right exhaust and intake ports 41*l*, 41*r* and the arrangement of the left and right intake ports 40*l*, 40*r*, it becomes possible to lower the upper height of the left and right cylinder heads 5*l*, 5*r*, and there is no longer any need to insert spaces close to the left and right cylinder heads 5*l*, 5*r* so as to arrange the intake system, which means that left and right front inclined portions 7*dl*, 7*dr* can be made to incline further towards the front. Thus, the spaces in front of the left and right step floors 2*l*, 2*r* are enlarged and the legroom of the floor space is widened and the riding feel is further improved.

With respect to the left and right intake and exhaust systems 38*l*, 38*r*, 39*l*, 39*r*, reciprocating rocker arms 43*l*, 43*r*, 44*l*, 44*r* are driven by push rods 45*l*, 45*r*, 46*l*, 46*r* (46*r* is not shown in the drawing), and the ends at the other side of these push rods 45*l*, 45*r*, 46*l*, 46*r* are arranged below the crankcase 8, and respectively engage with corresponding portions of a cam shaft 49 rotatably driven by a crankshaft 47 via a chain 48 (refer to FIG. 4 to FIG. 7).

In FIG. 3 and FIG. 5, a starting clutch 50 is provided at a rear portion of the crankshaft 47, and a gear 51 is integral with the output shaft 50*a* of the starting clutch 50 and interlocks with an input gear 52*b* integral with a casing 52*a* of a swash plate type hydraulic pump 52 of a hydraulic transmission HFT. The swash plate type hydraulic pump 52 and a swash plate type hydraulic motor 53 are connected at a gear ratio according to an inclined state of a swash plate 53*a* of the swash plate type hydraulic motor 53, and an output gear 53*c* is integral with an output shaft 53*b* of the swash plate type hydraulic motor 53 meshed with a gear 54*a* integral with an output shaft 54. Rotation of the crankshaft 47 is produced by the starting clutch 50 and the output shaft 54 through the swash plate type hydraulic motor 53 and the swash plate type hydraulic pump 52 of the hydraulic transmission HFT.

A moving end 55*a* of the swash plate driving mechanism 55 is connected to the swash plate 53*a* of the swash plate type hydraulic motor 53 with a pin 55*b*, and is screwed to a rotating shaft 55*c*. The rotating shaft 55*c* meshes with an output pinion 56*a* of the swash plate driving motor 56 through a reducing gear group 55*d*. The swash plate driving mechanism 55 is driven by rotation of the swash plate driving motor 56. The swash plate 53*a* of the swash plate type hydraulic motor 53 is inclined to a desired angle, and the hydraulic transmission HFT is set to a gear ratio according to this inclined angle.

A potentiometer 57 is connected via gear 57*a* to a pinion 55*e* of the rotating shaft 55*c* of the swash plate driving mechanism 55. The potentiometer 57 detects an inclination angle of the swash plate 53*a* of the swash plate driving mechanism 55, as well as the gear ratio of the hydraulic transmission HFT by detecting a rotation angle of the rotating shaft 55*c* of the swash plate driving mechanism 55.

The swash plate driving motor 56 and the potentiometer 57 are arranged between left and right support arms 16*r*, 16*l* behind the transmission case 9. The left and right support arms 16*r*, 16*l* are support sections of the rear fork 17, and are installed on a rear end wall 9*a* of the transmission case 9, so as to be detachable through the rear portion of the vehicle.

A starter motor 64 is connected via a chain 48 to the crankshaft 47, and an alternating current generator 59 is provided on the crankshaft 47.

Figure 4:
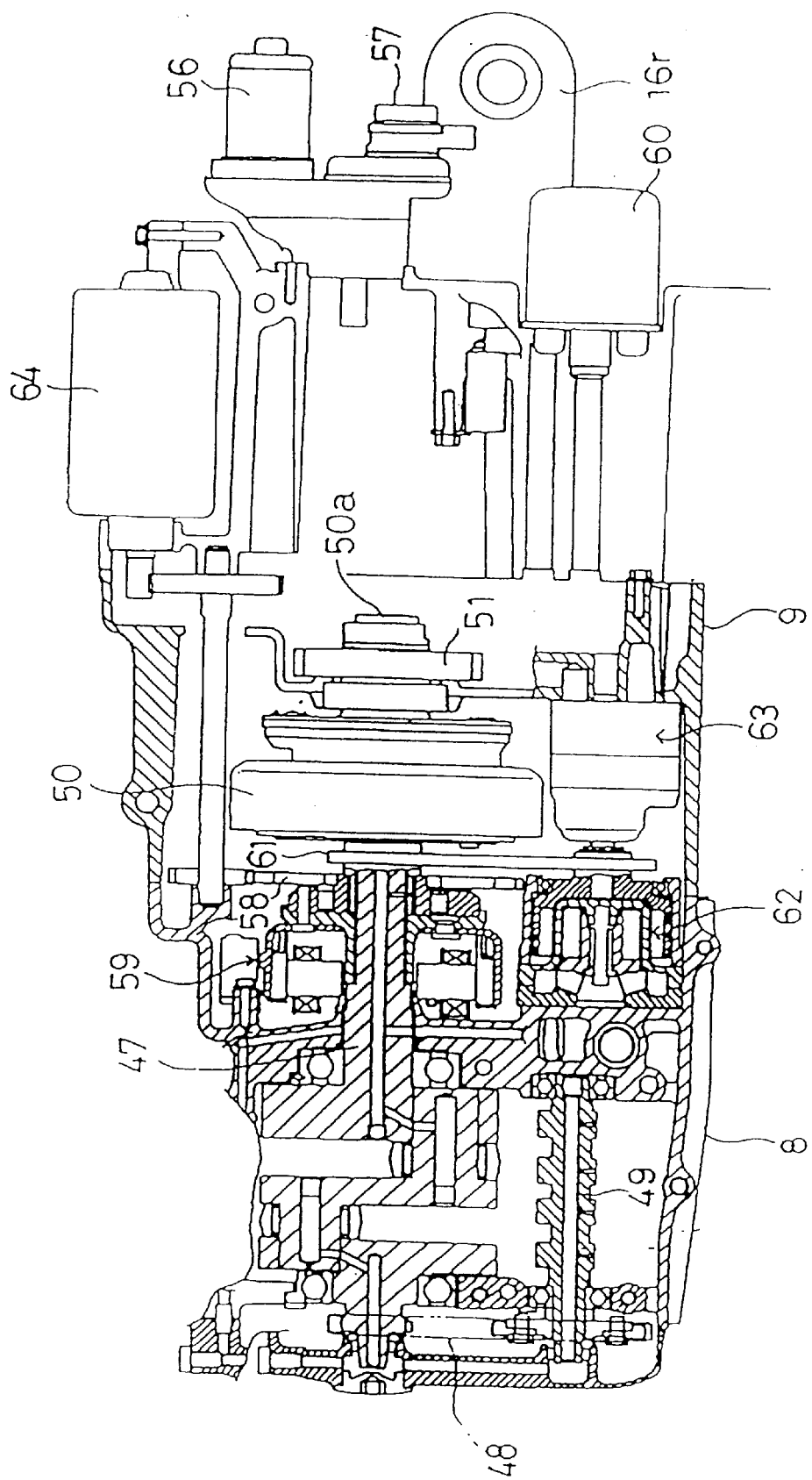
FIG. 4 is a partial longitudinal section, taken along line IV—IV in FIG. 3, with a push rod omitted from the drawing.

In FIG. 4, the rotation of the crankshaft 47 is transmitted to a cooling water pump 62 and an oil pump 63 through a chain transmission mechanism 61. The cooling water pump 62 is a magnet type pump. The two pumps are contained so as to extend into a rearwardly opening space of the crankcase 8 in connecting portions of the transmission case 9 and the crankcase 8. A breather chamber 65 is illustrated in FIG. 3.

Because the embodiment shown in FIG. 1 to FIG. 8 has the structure as described above, it is possible to attach the swash plate driving motor 56 and the potentiometer 57 to a rear wall 9*a* of the transmission case 9 from the rear of the vehicle, attachment and detachment of the swash plate driving motor 56 and potentiometer 57 is simplified, and maintenance, inspection and adjustment can be accomplished efficiently and easily.

Also, since the horizontal opposed 2-cylinder internal combustion engine 3 and the hydraulic transmission HFT are arranged longitudinally, the width of the power unit becomes narrow, the left and right step floors 2*l*, 2*r* become wide and operator comfort is improved.

Further, the swash plate driving motor 56 and the potentiometer 57 are sandwiched between the left and right support arms 16*r*, 16*l*, and are provided on a rear end wall 9*a* of the transmission case 9. This means that the swash plate driving motor 56 and the potentiometer 57 are sufficiently protected from the outside.

Upper rear wall surfaces (upper halves) of the cylinder heads 5*l*, 5*r* and the left and right cylinder head covers 6*l*, 6*r*, are formed sloping downwardly so that they are respectively high at the front and low at the rear. Since the height of the upper region of the intake and exhaust systems is low because of the arrangement having an included angle α of the left and right intake and exhaust valve systems 38*l*, 38*r*, 39*l*, 39*r*, it is possible to form left and right front inclined portions 7*dl*, 7*dr* continuously with the left and right step floors 2*l*, 2*r* and to be sloping strongly forward. As a result, the space in front of the left and right step floors 2*l*, 2*r* is enlarged, leg room in the floor part is widened and it is possible to significantly improve the feel of the vehicle during operation.

Since the exhaust pipes 35*l*, 35*r* protrude respectively downwardly to the rear of the vehicle body, there is absolutely no impediment to the formation of the forward sloping, left and right front inclined portions 7*dl*, 7*dr*. The formation of these portions is easier, and the left and right step floors 2*l*, 2*r* are not heated up by the heat of exhaust gas.

The rear lower wall surfaces (upper halves) of the left and right cylinder heads 5*l*, 5*r* and the left and right cylinder head covers 6*l*, 6*r*, and front upper wall surfaces and front lower wall surfaces are oriented in respective directions and are formed sloping upwardly or downwardly, margins occur in spaces facing these inclined wall surfaces and the layout of devices, machinery and parts is made easier.

A small vehicle (motorcycle) 1 having the low slung floor 2 of the present embodiment is provided with the horizontal opposed 2-cylinder internal combustion engine 3, but is not thus limited, and can be provided with a horizontal opposed internal combustion engine having more cylinders. Also, the embodiment is not limited to a motorcycle, and can be used with respect to a small vehicle having a pair of rear wheels.

Next, a second embodiment of the present invention as illustrated in FIG. 9 to FIG. 18 will be described.

Parts that are similar to parts having reference numerals in the first embodiment shown in FIG. 1 to FIG. 8 have the same reference numerals attached hereto.

Figure 9:
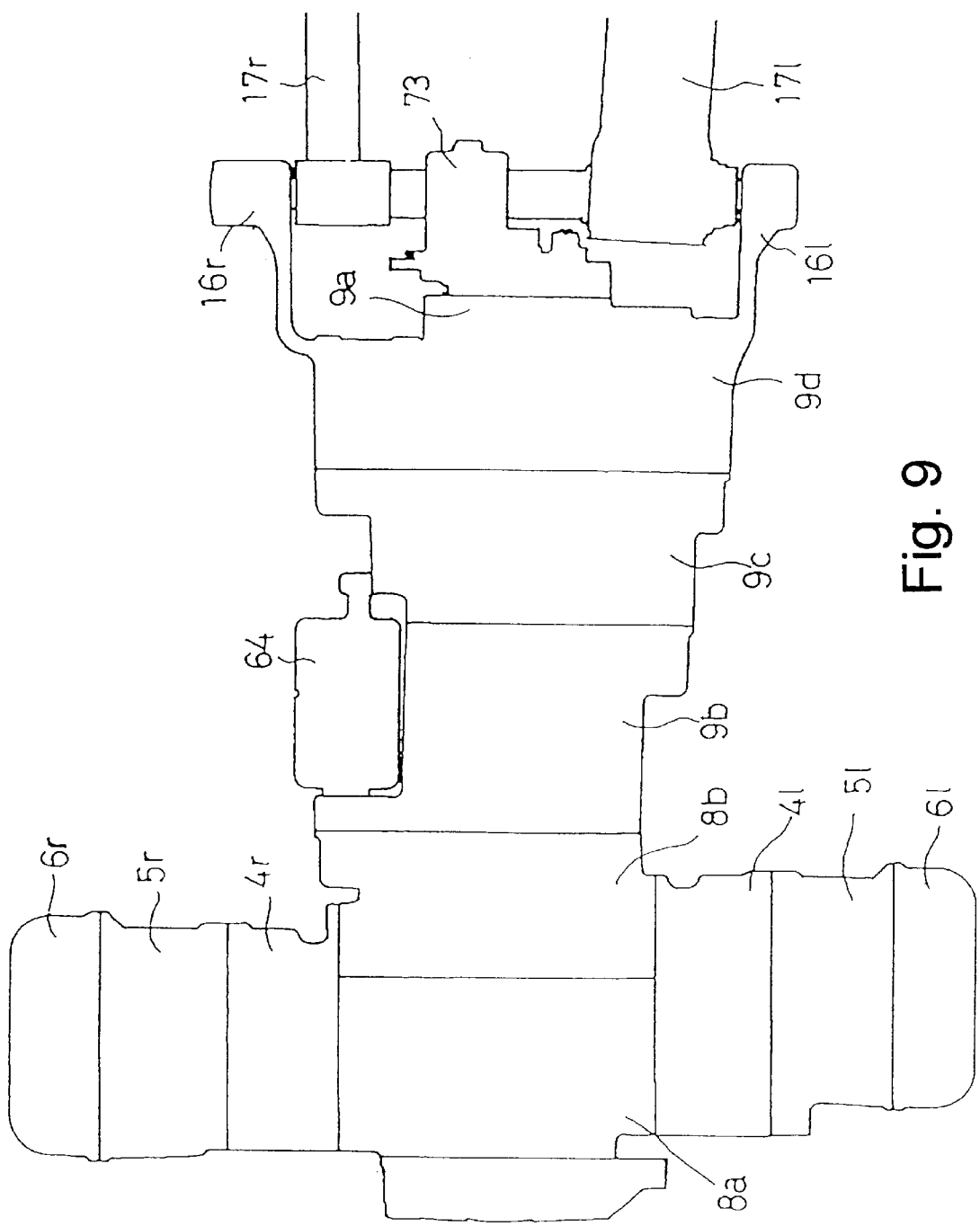
FIG. 9 is a plan view of a second embodiment of the present invention.

As shown in FIG. 9, the horizontal opposed 2-cylinder internal combustion engine 3 of the second embodiment is divided into left and right cylinders 4*l*, 4*r*, left and right cylinder heads 5*l*, 5*r* and left and right cylinder head covers 6*l*, 6*r*, substantially the same as the horizontal opposed 2-cylinder internal combustion engine 3 of the first embodiment.

However, differing from the valve system of the horizontal opposed 2-cylinder internal combustion engine 3 of the first embodiment is a push rod type OHV system. In the push rod type OHV system, intake and exhaust valve systems 38 and 39 are formed having a horizontal included angle α running along the longitudinal horizontal surface. The valve system of the horizontal opposed 2-cylinder internal combustion engine 3 of the second embodiment is a rocker arm type OHC system in which rocker arms 43 and 44 are pivoted on rocker arm shafts 66 oriented in a longitudinal direction and the intake and exhaust valve systems (not shown in the drawings) are provided so as to form a desired pinch angle running along left and right perpendicular surfaces. Another difference is that a chain sprocket 100 is wound around a driven sprocket 68 integral with a rocker arm shaft 66 and a drive sprocket 67 of a front part of the crankshaft 47.

In the first embodiment, an alternating current generator 59 was arranged further back relative to the horizontal opposed 2-cylinder internal combustion engine 3, but in the second embodiment the alternating current generator 59 is arranged further forward than the horizontal opposed 2-cylinder internal combustion engine 3.

In the first embodiment, the crankcase 8 is divided laterally, but in the second embodiment the crankcase 8 is longitudinally divided into a front crankcase 8*a* and a rear crankcase 8*b*.

Also, in the first embodiment, the transmission case 9 is divided in two in the longitudinal direction, but in the second embodiment the transmission case 9 is divided into three, namely a front transmission case 9*b*, a middle transmission case 9*c* and a rear transmission case 9*d*, while the output shaft 50*a* of the starting clutch 50 is connected to a gear transmission 70 through the gear 51 and the multiple plate friction clutch 69.

Still further, the gear 51, integral with the output shaft 50*a* of the starting clutch 50, meshes with an input gear 69*b* integral with a outer clutch 69*a* of the multiple plate friction clutch 69, a number of friction plates 69*d* are interposed between the outer clutch 69*a* and a inner clutch 69*c* of the multiple plate friction clutch 69, and a pressure plate 69*e* is arranged in front of the friction plates 69*d*. If a clutch lifter rod 69*f* penetrating through a main shaft 70*a* of the above described gear transmission 70 is pushed in a forward direction against the spring force of a plate spring 69*g*, engagement of the outer clutch 69*a* and the inner clutch 69*c* is disconnected.

Here the hydraulic transmission HFT of the first embodiment is replaced with a gear transmission 70 in the second embodiment.

The gear transmission 70 comprises a main shaft 70*a* oriented in a longitudinal direction, a counter shaft 70*b*, a transmission gear group 70*c* in which gears are fitted in splines of the shafts 70*a* and 70*b*, and are mutually meshed, a shift fork shaft 70*d* oriented in the longitudinal direction, a shift fork 70*e* engaged with the shift fork shaft 70*d* and a shift drum 70*f* oriented in the longitudinal direction. If the shift drum 70*f* is relatively driven by the transmission actuating motor 72, the shift fork 70*e* that is engaged with a peripheral groove of the shift drum 70*f* moves in an axial direction to selectively mesh with one of the transmission gear group 70*c*, so as to set a desired transmission ratio.

Figure 10:
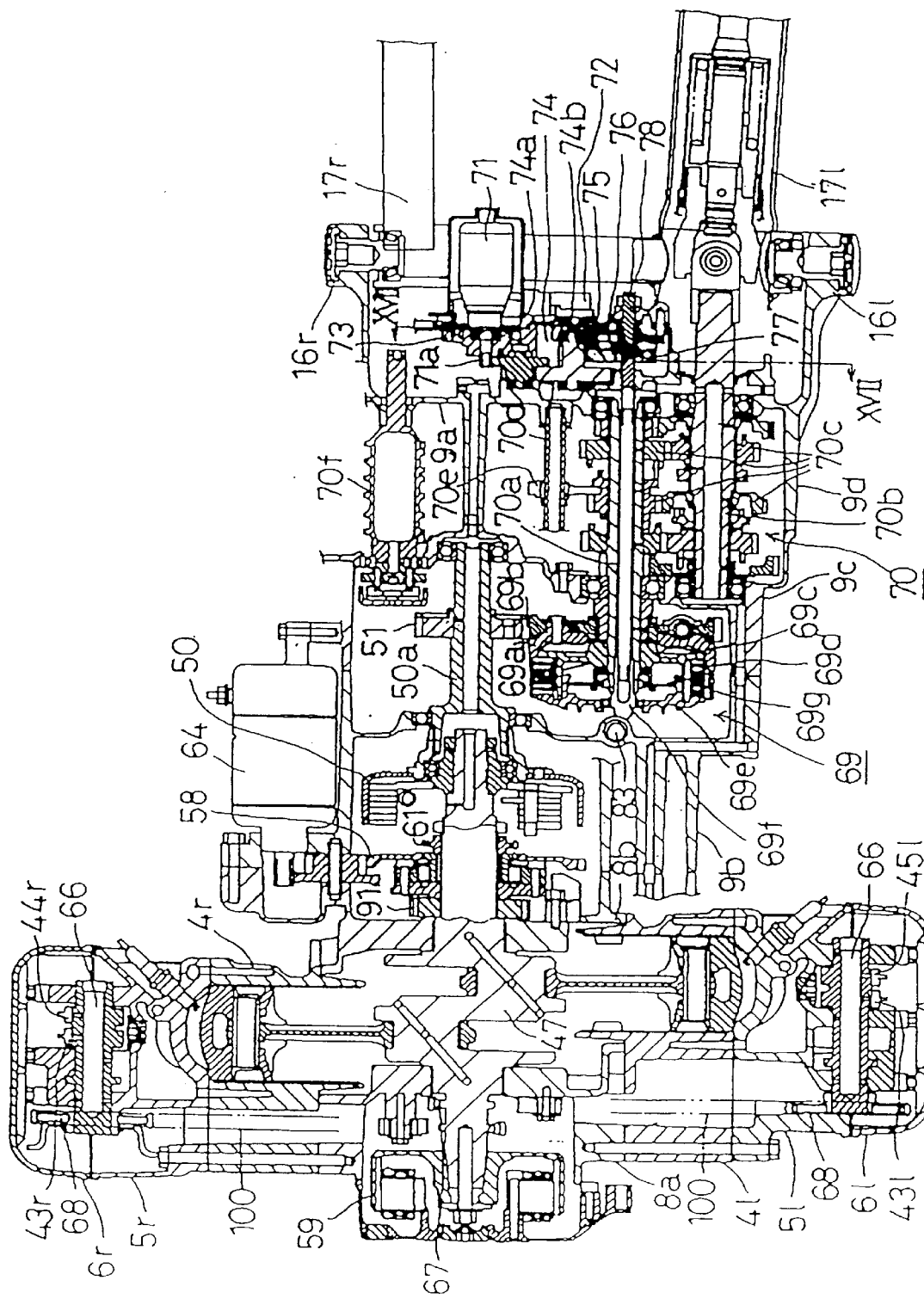
FIG. 10 is a cross-sectional view of FIG. 9.
Figure 18:
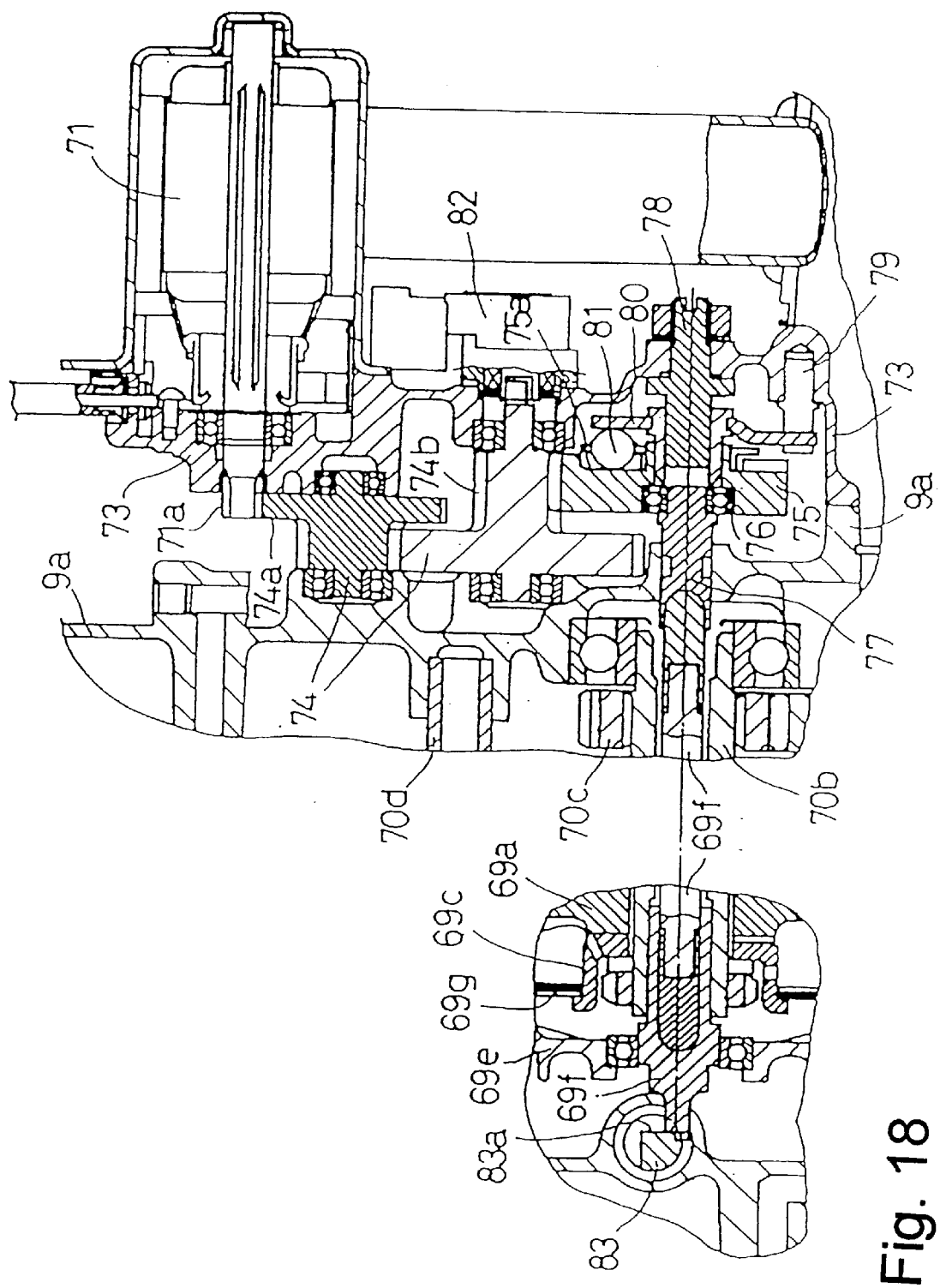
FIG. 18 is an enlarged cross-sectional view of essential parts of FIG. 10.

A clutch actuating motor 71 for driving the multiple plate friction clutch 69, as shown in FIG. 10 and FIG. 18, is attached to a clutch actuating motor base plate 73. The clutch actuating motor base plate 73 is attached to a rear end wall 9a of the transmission case 9, refer to the lower part of FIG. 18, so as to be detachable. A reduction gear group 74 is pivoted at the rear end wall 9a of the transmission case 9 and the clutch actuating motor base plate 73. An input gear 74a of the reduction gear group 74 meshes with a pinion 71a of the clutch actuating motor 71, and an output gear 74b of the reduction gear group 74 meshes with a lifter gear 75. The lifter gear 75 is engaged with a push shaft 77 through a bearing 76. The rotational output of the lifter gear 75 is not transmitted to the push shaft 77, but the push shaft 77 moves in an axial direction in response to movement of the lifter gear 75 in an axial direction.

A support shaft 78 is attached to the clutch actuating motor base plate 73 by being positioned to the rear of the lifter gear 75, and a ball 81 is interposed between a cam holding plate 80 that is fixed to the clutch actuating motor base plate 73 by a pin 79 by engagement with the support shaft 78, and a rear cam surface 75a of the lifter gear 75. If the lifter gear 75 is rotatively driven by the clutch actuating motor 71 the lifter gear 75 and the push shaft 77 are moved in an axial direction by the rear cam surface 75a of the lifter gear 75, the clutch lifter rod 69f of the multiple plate friction clutch 69 is pushed forward by the push shaft 77, and the multiple plate friction clutch 69 is disengaged.

Figure 15:
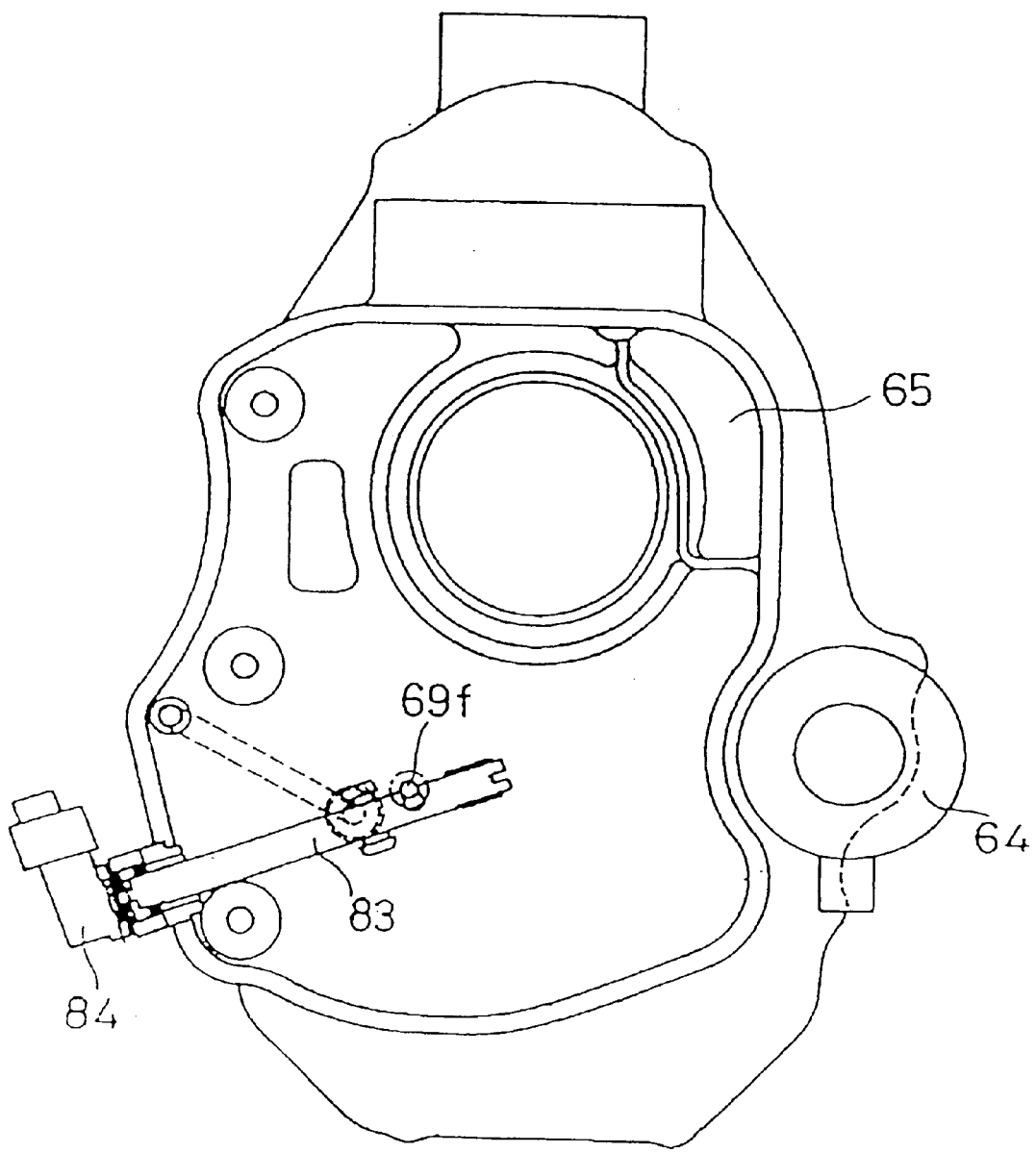
FIG. 15 is a view, observed from the direction shown by the line XV—XV of FIG. 11.

A clutch actuating motor rotation angle sensor 82 for detecting a rotation angle of the clutch actuating motor 71 is provided in the reduction gear group 74 of the gear transmission 70, and as shown in FIG. 10, FIG. 15 and FIG. 18. A detector 83 is pivoted at a front crankcase 9b relative to a tip of the clutch lifter rod 69f of the multiple plate friction clutch 69, and a clutch disengage sensor 84 is connected to the detector 83. When the multiple plate friction clutch 69 is put into the disengaged state by the clutch lifter rod 69f being pushed forwardly, the detector 83 rotates because the tip of the clutch lifter rod 69f hits against a cut end face 83a of the detector 83, as shown in the left side portion of FIG. 18. The clutch disengage sensor 84 detects that the multiple plate friction clutch 69 is disengaged.

By providing the clutch disengage sensor 84 in this way, the effects caused by the play of the clutch actuating system are reduced, and it is possible to carry out a smooth transmission actuation while reducing the time required for transmission actuation.

Figure 12:
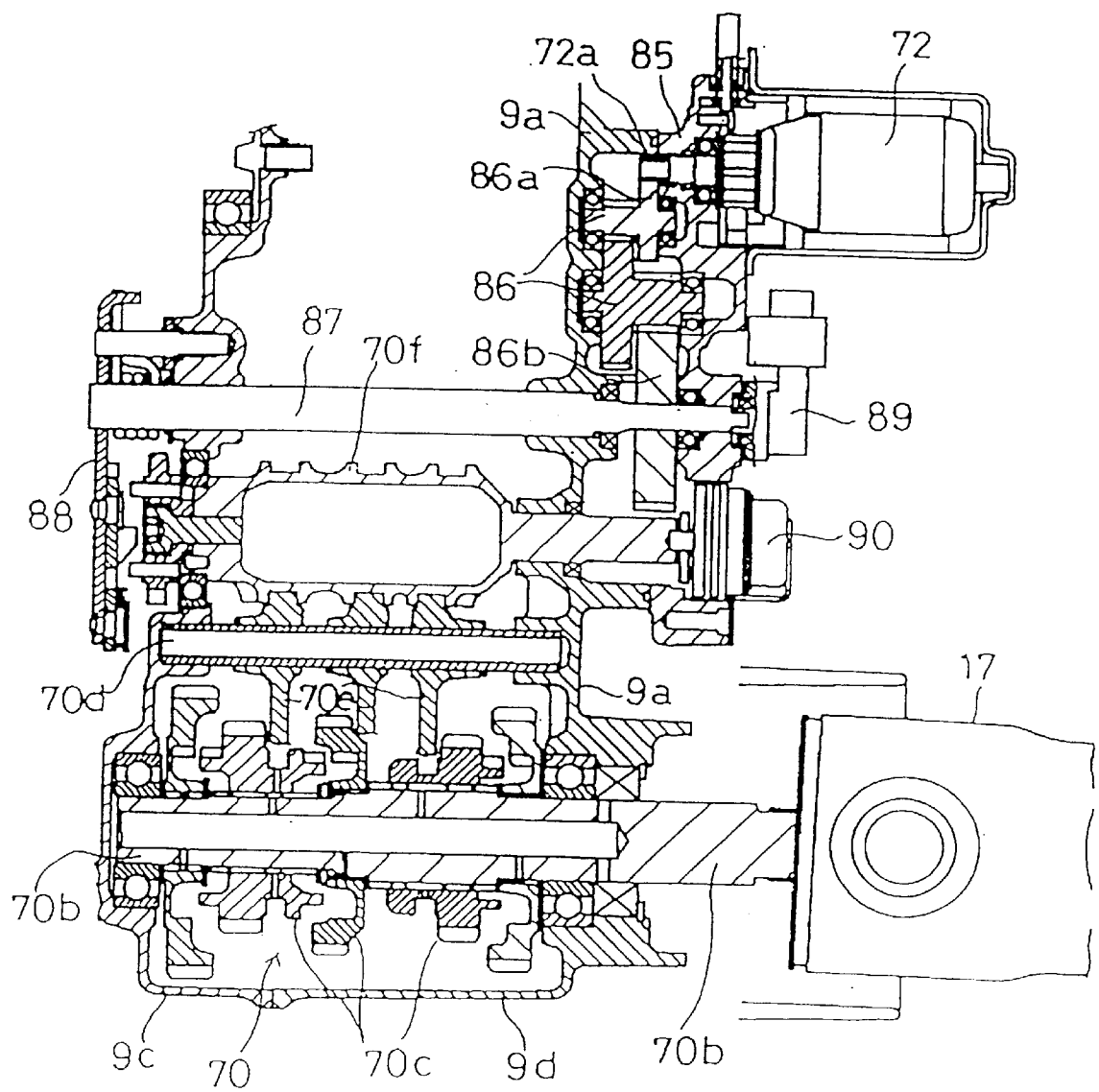
FIG. 12 is a cross-sectional view of a geared transmission of the second embodiment.

As shown in FIG. 12, the transmission actuating motor 72 for driving the gear transmission 70 is attached to a transmission actuating motor base plate 85, the transmission actuating motor base plate 85 is detachably fixed to the rear end wall 9a of the transmission case 9, and a reduction gear group 86 is pivoted at the rear end wall 9a of the transmission case 9 and the transmission actuating motor base plate 85. An input gear 86a of the reduction gear group 86 meshes with a pinion 72a of the transmission actuating motor 72 and an output gear 86b of the reduction gear group 86 meshes with a spindle shaft 87. The spindle shaft 87 is connected to the shift drum 70f of the gear transmission 70 through a shift drum feed mechanism 88, and if the transmission actuating motor 72 rotates by only a desired number of rotations the shift drum 70f is driven by a desired angle of rotation and the gear transmission 70 is set to a desired transmission ratio by movement of the specific shift drum 70e in the axial direction.

A shift drum rotation angle detecting sensor 89 is provided on a rear end of the spindle shaft 87, and a shift position sensor 90 positioned below the shift drum rotation angle detecting sensor 89 is linked to the shift drum 70f. A shift position of the gear transmission 70 is detected by the shift position sensor 90, and the shift position of the gear transmission 70 is displayed on an instrument panel, not shown in the drawings, arranged at the front of the motorcycle 1.

Figure 11:
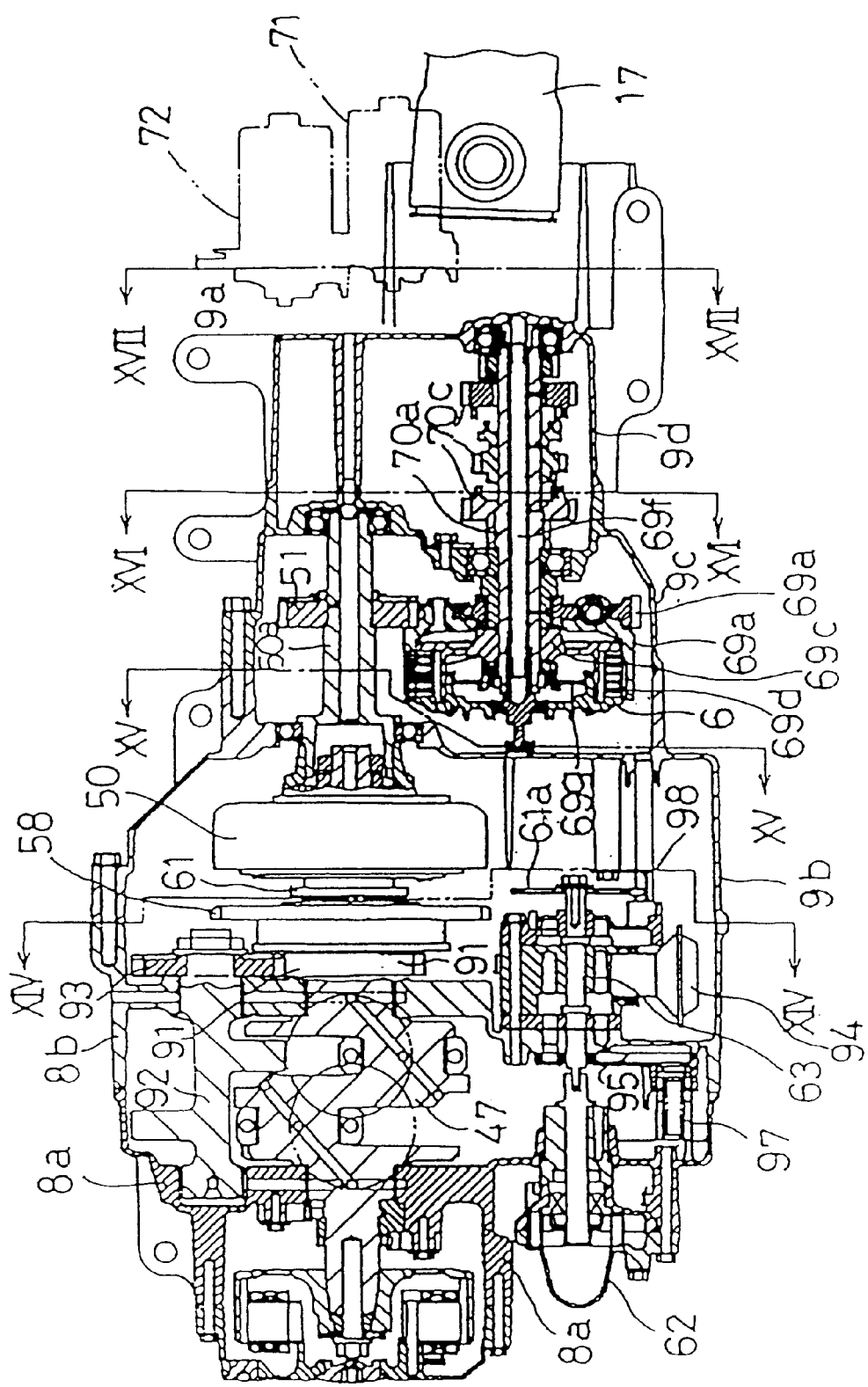
FIG. 11 is a left side cross-sectional view of FIG. 9.

As shown in FIG. 11, a balancer drive gear 91, positioned in front of the one-way starter switch 58, is engaged with the crankshaft 47, a balancer 92 positioned above the crankshaft 47 is pivoted at the crankcase 8 so as to rotate parallel to the crankshaft 47, a balancer driven gear 93 integral with the balancer 92 meshes with the balancer drive gear 91, and the balancer 92 is driven to rotate in a direction opposite the rotational direction of the crankshaft 47.

Figure 13:
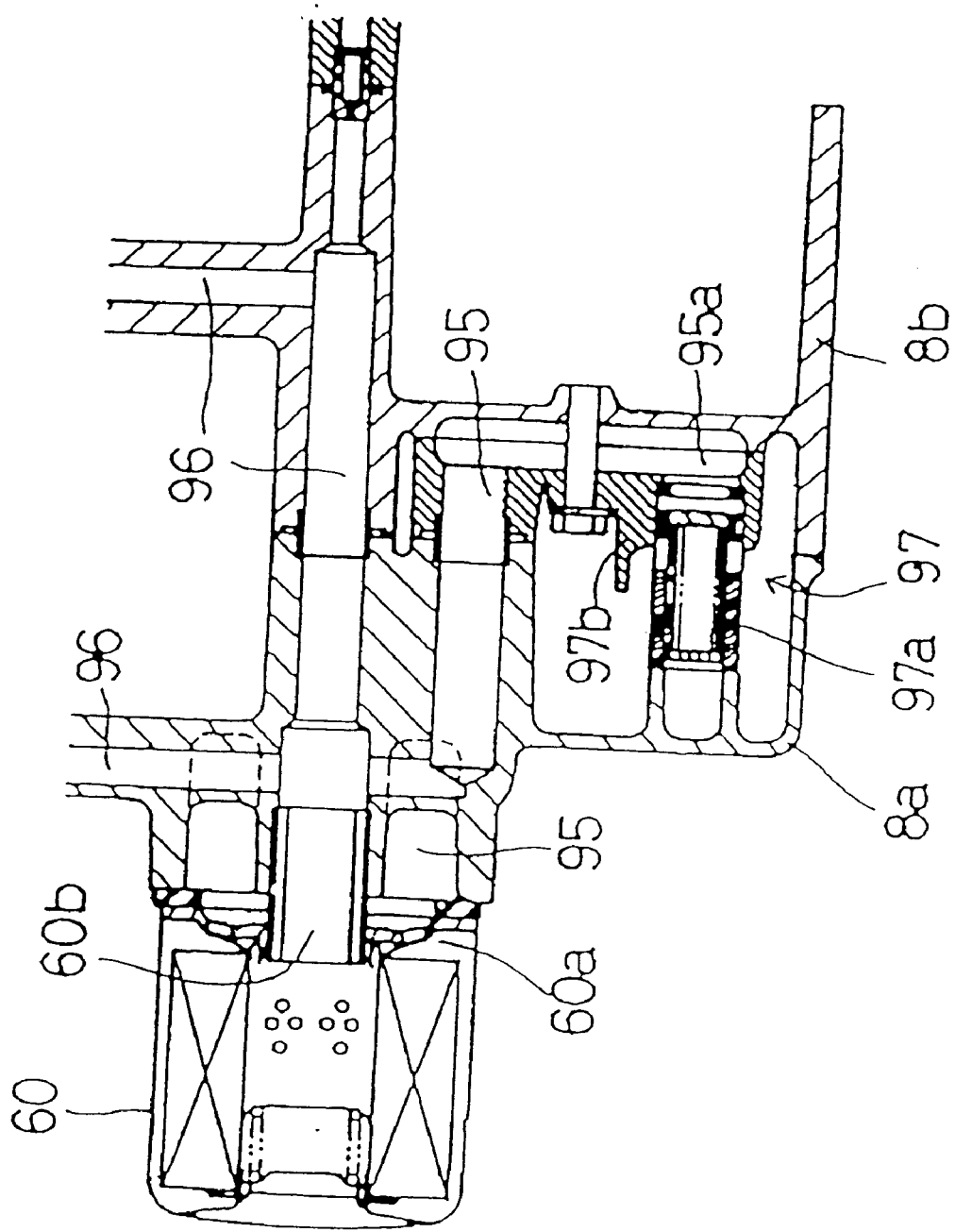
FIG. 13 is a cross-sectional view of a relief valve and an oil filter of the second embodiment.

Lubricating oil remaining in the front transmission case 9b of the transmission case 9 is sucked in to an oil pump 63 through a strainer 9 and, as shown in FIG. 13, is supplied to an outer oil chamber 60a of an oil filter 60 through a discharge path 95. Lubricating oil that has been filtered in the oil filter 60 is supplied to the respective lubricating sections of the horizontally opposed 2-cylinder internal combustion engine 3, the multiple plate friction clutch 69, and the gear transmission 70 through lubricating oil paths 96.

Figure 14:
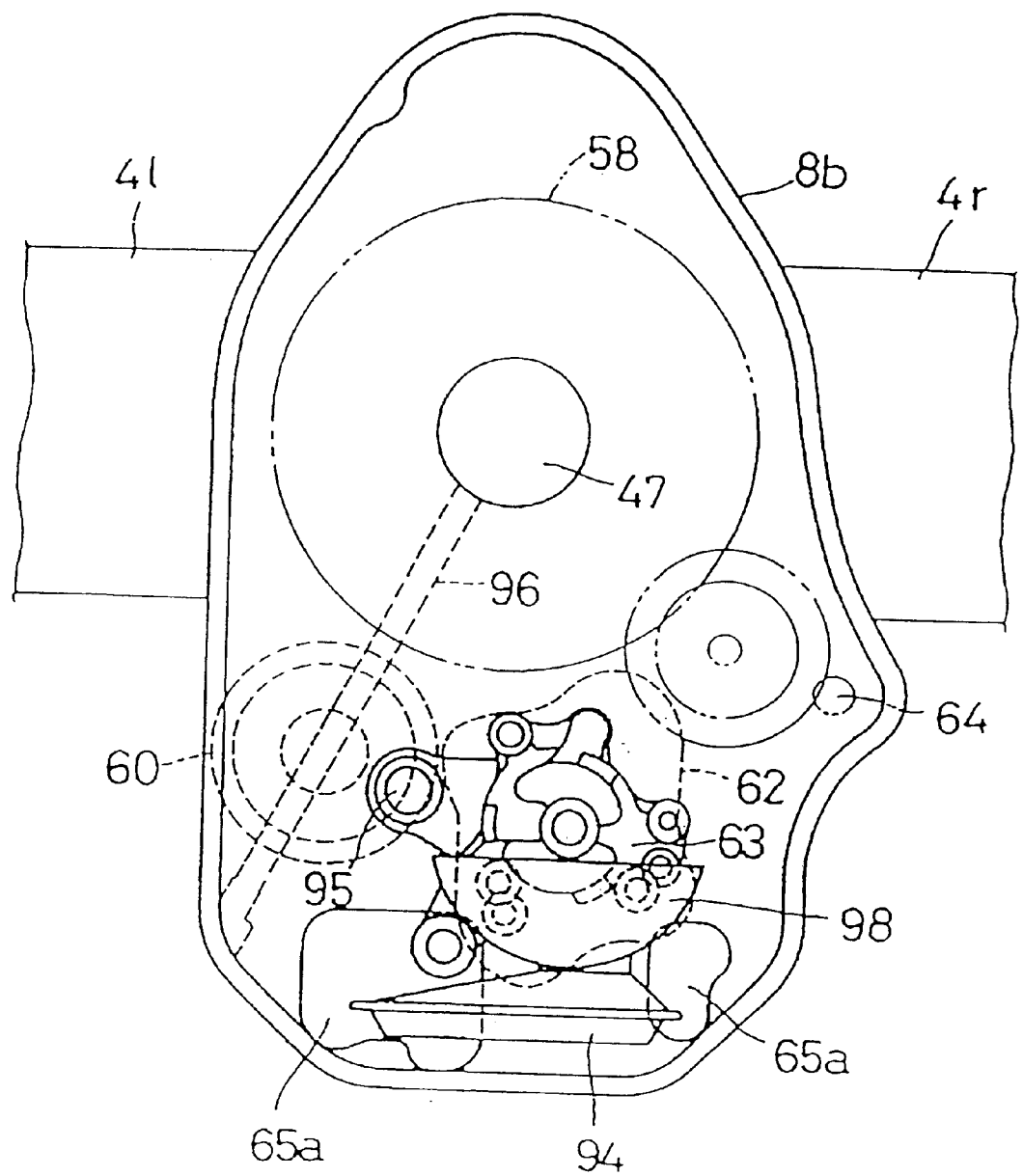
FIG. 14 is a view, observed from the direction shown by the line XIV—XIV of FIG. 11.

The lubricating oil sump 98 in FIG. 1 and FIG. 14 is covered by a lower part of a driven sprocket 61a of the chain transmission mechanism 61, and lubricating oil remaining in the lubricating oil sump 98 is used to lubricate the chain transmission mechanism 61.

As shown in FIG. 13, a relief valve 97 is provided in a branch path 95a of the discharge path 95. If the pressure inside the discharge path 95 exceeds a relief pressure, lubricating oil is discharged from the relief valve 97.

As shown in FIG. 13, a relief valve case 97a of the relief valve 97 is engaged with an attachment lug 97b that are integral with a rear crankcase 8b. If a front crankcase 8a and the rear crankcase 8b are combined, the relief valve case 97a is pushed forward by the rear crankcase 8b and fixed by the attachment lug 97b so that it cannot be pulled out.

Figure 16:
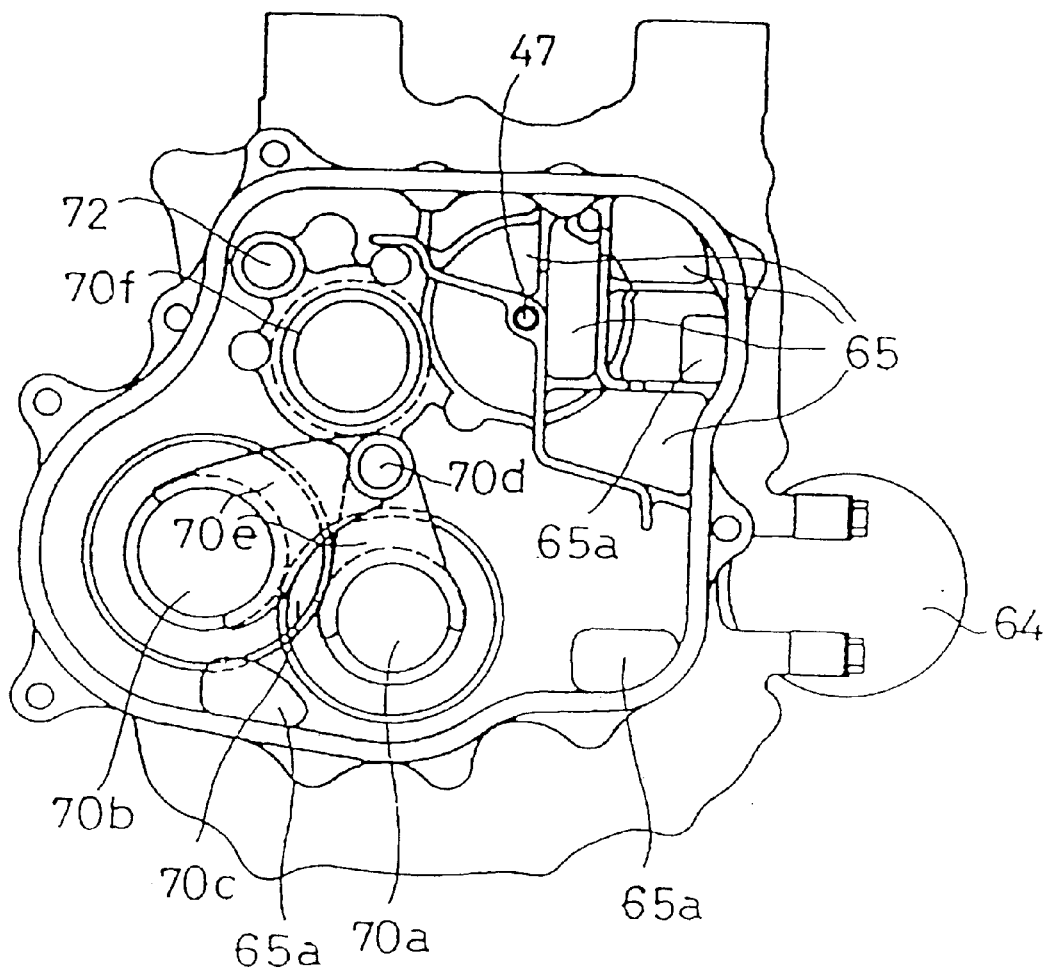
FIG. 16 is a view, observed from the direction shown by the line XVI—XVI of FIG. 11.
Figure 17:
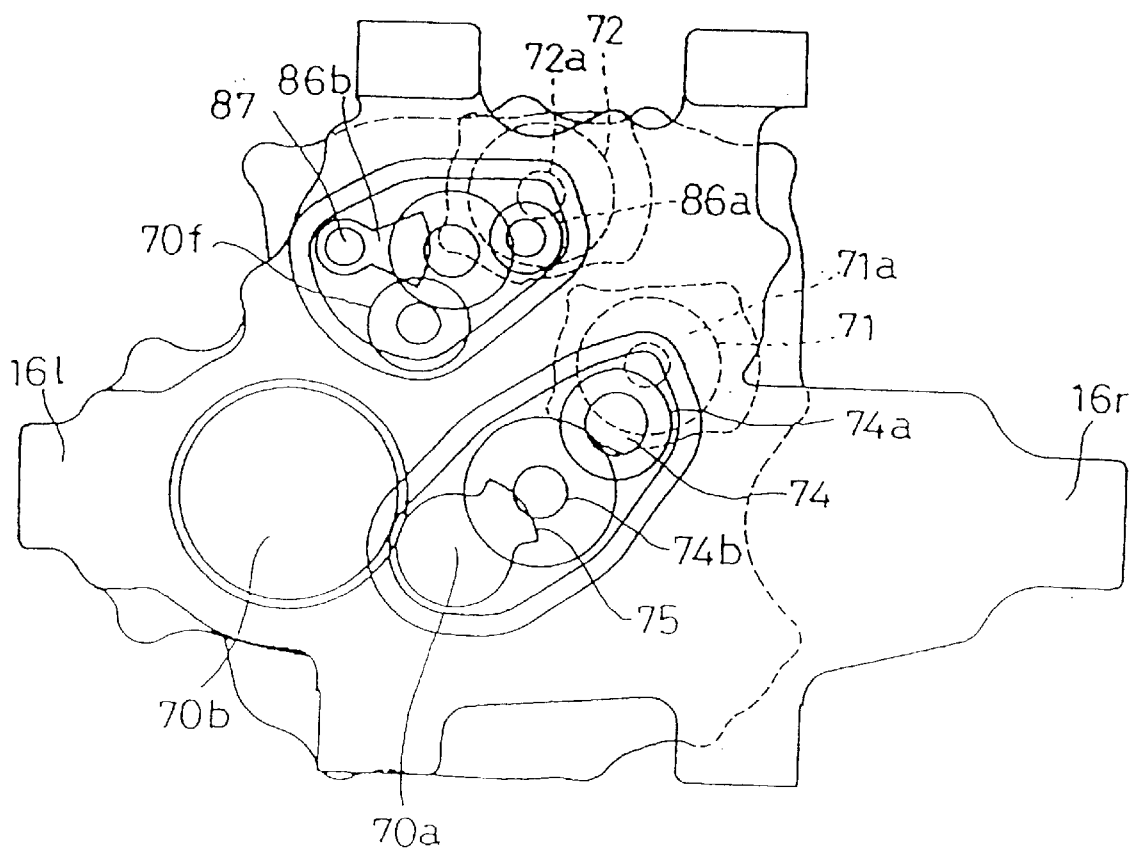
FIG. 17 is a view, observed from the direction shown by the line XVII—XVII of FIG. 11.

As shown in FIG. 15 and FIG. 16, a number of breather chambers 65 are formed in the front transmission case 9b, middle transmission case 9c, and rear transmission case 9d, along the length of the transmission case 9. The transmission cases and breather chambers are mutually connected by opening portions 65a.

In this way, the integral attachment lug 97b holds the relief valve 97 and at the same time acts as an oil distribution path for the oil filter 60.

A transmission actuation control device, not shown in the drawings, is provided in the vehicle body cover 7 positioned above the horizontal opposed 2-cylinder internal combustion engine 3, and a shift-up push-button switch and a shift-down push-button switch (neither of which are shown in the drawings) are provided adjacent to the handlebar grip. If the shift up push-button switch is pressed, the clutch actuating motor 71 is operated by a control signal of the transmission actuation control device to disconnect the multiple plate friction clutch 69 (the transmission actuating motor 72 is operated by a disengage signal from the clutch disengage sensor 84 so as to cause the gear transmission 70 to shift up one stage), the multiple plate friction clutch 69 is reconnected by a shift up signal of the shift drum rotation angle detecting sensor 89, and the shift up operation is completed.

The shift down operation is also carried out by a similar operation.

To carry out multiple stage shift up or shift down, the shift up push-button switch or shift down push-button switch is pressed again after the shift up or shift down has been completed for one stage, and this can be repeated.

As has been described above, the embodiment shown in FIG. 9 to FIG. 17 can carry out automatic disengaging and engaging of the multiple plate friction clutch 69, and shift up and shift down of the gear transmission 70, simply by pressing a shift up push-button switch or a shift down push-button switch, which means that the rider can travel on the motorcycle 1 in extreme comfort.

Also, the clutch actuating motor 71, the power transmission system for the clutch actuating motor 71, and the clutch actuating motor rotation angle sensor 82 are provided on the rear end wall 9*a* of the transmission case 9. The transmission actuating motor 72, the power transmission system for the transmission actuating motor 72, the shift drum rotation angle detecting sensor 89 and the shift position sensor 90 are also provided on the rear end wall 9*a* of the transmission case 9. This means that even if the motorcycle 1 is in an assembled state with the horizontal opposed 2-cylinder internal combustion engine 3, multiple plate friction clutch 69 and gear transmission 70 attached, these components can be checked from the rear of the vehicle frame, and maintenance and adjustment can be easily carried out by simply pulling them out from the rear of the vehicle frame.

Further, since the clutch actuating motor 71, transmission actuating motor 72 and power transmission sensors for the clutch actuating motor 71 and transmission actuating motor 72 are provided in the rear end wall 9*a* of the transmission case 9, and the external parts thereof are covered by the vehicle body cover 7, they are sufficiently protected stones, etc . . . flying in from the front of the vehicle. The endurance and reliability are significantly improved.

Since the power transmission system of the motorcycle 1 is constituted by the multiple plate friction clutch 69 and the gear transmission 70, fuel consumption is improved regardless of the riding comfort.

If the front crankcase 8*a* and the rear crankcase 8*b* are divided longitudinally it is easy to remove the relief valve 97, and maintenance, checking and adjustment of the relief valve 97 can be carried out easily.

Moreover, since the plurality of breather chambers 65 are formed using spaces inside the transmission case 9, there is no need to enlarge the volume of the crankcase 8 of the horizontal opposed 2-cylinder internal combustion engine 3, and the horizontal opposed 2-cylinder internal combustion engine 3 can be reduced in size.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A power unit for a motorcycle, the power unit having an internal combustion engine mounted with a crankshaft oriented in a longitudinal direction of the power unit, a transmission arranged behind the internal combustion engine, and a front section and a rear section, the power unit comprising:

a casing for the power unit, said casing including a rear end with a left rear end and a right rear end, a left rear end support arm and a right rear end support arm, each support arm provided with a pivot portion for pivotably connecting with a rear fork of the vehicle, and a rear wall provided between said left and right rear end support arms, said casing including a transmission case and a crankcase for said internal combustion engine;

a transmission actuating device secured to the rear end of the casing; and an electric motor for driving the transmission actuating device connected at said rear wall of said casing and interposed within a space formed between said left and right rear end support arms, wherein said electric motor for driving the transmission actuating device is mounted to the rear end of the casing and the power unit is capable of being mounted in a longitudinal direction of a vehicle body, wherein the vehicle includes the rear fork for supporting a rear wheel of said vehicle, a left arm portion of the rear fork, a right arm portion of the rear fork, a left front end of the left arm portion, and a right front end of the right arm portion, said left front end and said right front end being connected to the respective left and right rear end support arms by the respective pivot portions of the power unit casing, wherein the rear fork pivots around the pivot portions in a vertical direction of the vehicle body.

2. The power unit according to claim 1 further comprising:

a clutch;

a clutch actuating device; and an electric motor for driving the clutch actuating device.

3. The power unit according to claim 2, wherein the electric motor for driving the clutch actuating device is arranged in the rear section of the power unit.

4. The power unit according to claim 1, wherein at least one of the electric motor for driving the clutch actuating device and the electric motor for driving the transmission actuating device is capable of being arranged between the pair of pivot portions of the vehicle.

5. The power unit according to claim 1, wherein said transmission is a gear transmission.

6. The power unit according to claim 1, wherein the transmission actuating device comprises a shift drum and shift fork.

7. The power unit according to claim 2, wherein said clutch is a multiple plate friction clutch.

8. The power unit according to claim 2, wherein the clutch actuating device comprises a reduction gear group, a lifter gear, a push shaft, and a clutch lifter rod.

9. The power unit according to claim 1, wherein a rotational shaft of said electric motor for driving the transmission actuating device is mounted in the longitudinal direction of the power unit.

10. The power unit according to claim 2, wherein a rotational shaft of said electric motor for driving the clutch actuating device is mounted in the longitudinal direction of the power unit.

11. The power unit according to claim 2, wherein a rotational shaft of said electric motor for driving the transmission actuating device and a rotational shaft of said electric motor for driving the clutch actuating device are mounted in the longitudinal direction of the power unit.

12. A power unit for a motorcycle, the power unit having an internal combustion engine mounted with a crankshaft oriented in a longitudinal direction of the power unit, a transmission arranged behind the internal combustion engine, and a front section and a rear section, the power unit comprising:

a clutch;

a casing for the power unit, said casing including a rear end with a left rear end and a right rear end, a left rear end support arm and a right rear end support arm, each support arm provided with a pivot portion for pivotably connecting with a rear fork of the vehicle, and a rear wall provided between said left and right rear end support arms, said casing including a transmission case and a crankcase for said internal combustion engine;

a clutch actuating device secured to a rear end wall of the rear end of the casing; and an electric motor for driving the clutch actuating device connected at said rear wall of said casing and interposed within a space formed between said left and right rear end support arms, and the power unit is capable of being mounted in a longitudinal direction of a vehicle body, wherein the electric motor for driving the clutch actuating device is arranged between the pair of pivot portions, and wherein the vehicle includes a rear fork for supporting a rear wheel of said vehicle, a left arm portion of the rear fork, a right arm portion of the rear fork, a left front end of the left arm portion, and a right front end of the right arm portion, said left front end and said right front end being connected to the respective left and right rear end support arms by the respective pivot portions, wherein the rear fork pivots around the pivot portions in a vertical direction of the vehicle body.

13. The power unit according to claim 12, wherein said clutch is a multiple plate friction clutch.

14. The power unit according to claim 12, wherein the clutch actuating device comprises a reduction gear group, a lifter gear, a push shaft, and a clutch lifter rod.

15. The power unit according to claim 12 further comprising a rotational shaft of said electric motor for driving the clutch actuating device is mounted in the longitudinal direction of the power unit.

* * * * *

UNITED STATES PATENT AND TRADEMARK OFFICE
CERTIFICATE OF CORRECTION

PATENT NO.     : 6,357,545 B1
DATED          : March 19, 2002
INVENTOR(S)    : Yoshiaki Hori et al.

It is certified that error appears in the above-identified patent and that said Letters Patent is hereby corrected as shown below:

<u>Title page,</u>
Item [73] Assignee, please correct the assignee's name from "Honda Giken Kabushiki Kaisha" to -- Honda Giken Kogyo Kabushiki Kaisha --.

Signed and Sealed this

Sixth Day of August, 2002

*Attest:*

JAMES E. ROGAN
*Attesting Officer*     *Director of the United States Patent and Trademark Office*